(12) United States Patent
Atkinson

(10) Patent No.: US 9,294,155 B2
(45) Date of Patent: Mar. 22, 2016

(54) NEAR-FIELD COMMUNICATION AND IMPACT SENSOR

(75) Inventor: Lee Warren Atkinson, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/376,914

(22) PCT Filed: Feb. 24, 2012

(86) PCT No.: PCT/US2012/026487
§ 371 (c)(1),
(2), (4) Date: Aug. 6, 2014

(87) PCT Pub. No.: WO2013/126067
PCT Pub. Date: Aug. 29, 2013

(65) Prior Publication Data
US 2014/0370806 A1    Dec. 18, 2014

(51) Int. Cl.
*H04B 5/00* (2006.01)
*H04W 48/16* (2009.01)
*G06K 19/07* (2006.01)
*G06K 19/073* (2006.01)

(52) U.S. Cl.
CPC .......... *H04B 5/0056* (2013.01); *G06K 19/0717* (2013.01); *G06K 19/07345* (2013.01)

(58) Field of Classification Search
CPC ....................................................... H04B 5/00
See application file for complete search history.

(56) References Cited

U.S. PATENT DOCUMENTS

| | | | |
|---|---|---|---|
| 2003/0217179 A1* | 11/2003 | Famolari et al. | 709/245 |
| 2004/0233043 A1 | 11/2004 | Yazawa et al. | |
| 2005/0228887 A1* | 10/2005 | Wang et al. | 709/227 |
| 2005/0238276 A1* | 10/2005 | Kump | 385/7 |
| 2006/0103534 A1* | 5/2006 | Arms et al. | 340/572.1 |
| 2007/0133041 A1* | 6/2007 | Tredoux et al. | 358/1.15 |
| 2008/0244752 A1* | 10/2008 | Gudan et al. | 726/27 |
| 2009/0164514 A1* | 6/2009 | Svendsen et al. | 707/104.1 |
| 2009/0256681 A1* | 10/2009 | Collins et al. | 340/10.1 |
| 2010/0320266 A1* | 12/2010 | White | 235/375 |
| 2011/0070829 A1* | 3/2011 | Griffin et al. | 455/41.1 |
| 2011/0127843 A1* | 6/2011 | Karaoguz et al. | 307/104 |
| 2012/0238209 A1* | 9/2012 | Walker et al. | 455/41.2 |

FOREIGN PATENT DOCUMENTS

| | | |
|---|---|---|
| CN | 101552806 | 10/2009 |
| CN | 102231776 | 11/2011 |
| JP | 2011-028424 A | 2/2011 |
| KR | 10-2010-0042857 A | 4/2010 |
| KR | 20100042857 | 4/2010 |

OTHER PUBLICATIONS

International Search Report and Written Opinion received in PCT Application No. PCT/US2012/026487, mailed Dec. 20, 2012, pp. 9.

\* cited by examiner

*Primary Examiner* — Cindy Trandai
(74) *Attorney, Agent, or Firm* — HP Legal Department

(57) ABSTRACT

A device including at least one of an NFC reader or and NFC tag. An impact sensor to detect an impact to the device. Wherein the impact to the device effects whether data is transferred to a second device.

13 Claims, 8 Drawing Sheets

NEAR-FIELD COMMUNICATION AND IMPACT SENSOR

BACKGROUND

Near-field communication (NFC) is a set of short-range wireless technologies, that may have a range of 4 cm or less. NFC tags contain data and are typically read-only but may be rewriteable. They can be custom-encoded by their manufacturers. Near-field communication uses magnetic induction between two loop antennas located within each other's near field, effectively forming an air-core transformer.

BRIEF DESCRIPTION OF THE DRAWINGS

Some embodiments of the invention are described with respect to the following figures.

DETAILED DESCRIPTION

Figure 1:
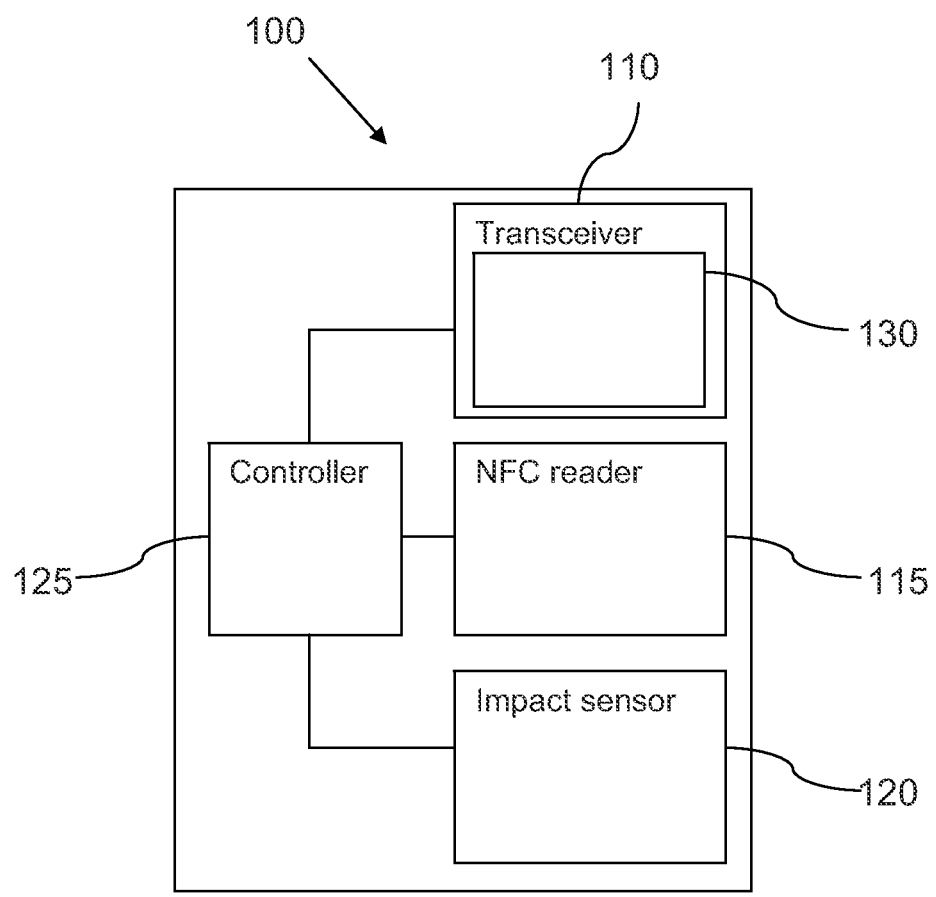
FIG. 1 is a block diagram of a portable computing device according to an example implementation.

NFC can be used to set up Bluetooth pairing and setup a wireless local area network access. NFC has been used to send data between two devices. An NFC device can read the data on an NFC tag without contacting the tag. The reader may be as much as 20 centimeters in some cases. This means that and NFC enabled devices could read the NFC tag on another device from 20 centimeters away. If the NFC reader and tag are used to establish a data transfer between two devices then a security problem arises when data is transferred from one device to another when the devices are merely within a range. For example what if the device was a cell phone with a NFC reader and a second cell phone with an NFC tag and the second cell phone was inadvertently brought in range of each other such as being in the pockets of two users sitting next to each other on a public transportation system each with an NFC enabled cell phone causing data to be transferred from one cell phone to another cell phone.

To initiate a data transfer, impact sensors along with location data, may be used to match two cell phones that are trying to transfer data. An impact sensor may be for example an accelerometer. For example each cell phone can upload to a network the location data and impact sensor data when the devices are impacted together. A server on the network can determine which two phones should be paired from data that the phones are on the same cellular tower, that the impacts detected by the impact sensors were at a similar force on each device and the time of the impact was at a similar time. However, if two phones were impacted together and two other phones were impacted together, the server may not be able to determine which of the 4 phones were supposed to be transferring data. For example if two phones were to exchange contact data and another two phones were to exchange a web link the server would not know which two phones to share the contact data with and which two phones to share the web link with. Using an impact sensor may cause the user to indicate that a data transfer was going to occur or the device would often send data to the network every time an impact was detected but searching for and NFC device may allow a device to send data to the network if anther NFC device is in range rather than every time an impact is detected. In an embodiment where two phones were paired using the NFC they could exchange impact sensor data to confirm that they were just bumped together.

To increase the security of device to device data communication both an NFC and an impact sensor may be used together. For example the impact sensor may be used to detect that an impact has occurred. The system may then turn on the NFC reader to determine if an NFC tag is in range. The NFC code, such as an internet protocol (ip) address, read from the NFC tag can be used by the network to determine how to route data from one device to another on the network in a device to device transfer eliminating the confusion that is created by using data from the impact sensor and also eliminating the possibility of transferring data without two devices employing NFC without impacting each other. Further, not continuously polling for data by the NFC reader can save battery power.

In one embodiment, a portable computing device can include a wireless transceiver connected to a network. The portable computing device can include a near field communication (NFC) reader and an impact sensor. A controller can be connected to the impact sensor. The controller can transmit a NFC code through the wireless transceiver to a network if an impact is detected by the impact sensor. The NFC reader can read the NFC code if a second device is in range of the NFC reader when the impact occurs.

In another embodiment, a portable computing device can include a wireless transceiver to connect to a second device. The portable computing device can include a near field communication (NFC) reader and an impact sensor. A controller can be connected to the impact sensor to compare impact sensor data to a threshold value and to establish a wireless connection to a second device from data such as a media access control (MAC) address read with the NFC reader. The controller can transmit the impact sensor data to the second device through the wireless connection.

In one embodiment, a method of communicating NFC code from a device can include detecting an impact with an impact sensor. If the impact sensor detects an impact of more than a threshold level then allowing an NFC tag to transmit an NFC code.

With reference to the figures, FIG. 1 is a block diagram of a portable computing device 100 according to an example implementation. The portable computing device 100 can include a wireless transceiver 110. The wireless transceiver 110 may be connected to a network or to a second device to transmit data 130. A near field communication (NFC) reader 115 can be used to read NFC codes from a second device if the second device includes an NFC tag and the NFC reader is within a range to read the NFC tag on the second device.

An impact sensor 120 can detect movement of the portable computing device 100 and generate impact sensor data representing the movement. The movement may be for example an impact with a second device. A controller can be connected to the impact sensor to receive the impact sensor data. The controller may compare the impact sensor data to a threshold value. For example if the threshold is 1 newton of force and the impact sensor detects an impact that generates 2 newtons of force the controller can perform a function.

In one embodiment if a second device is in range of the NFC reader when the impact occurs, the NFC reader can read an NFC code from the second device. The controller can then transmit NFC code read by the NFC reader through the wireless transceiver to a network. The network such as the internet and may be accessed through a cellular network such as Global System for mobile communication (GSM), Code Division multiple access (CDMA), Long Term Evolution (LTE) or another network. The network can use the NFC code to determine how to route data between the portable computing device and the second device. Bumping two devices together may be used to transmit data through a network to the second device but without a unique code for the second device the routing of the data from the first device to the second device is only by guessing which device is the second device such as by using global positioning systems (GPS), cellular towers, and the impact sensor data from the portable communication device and the second device. Sending the NFC data though the network makes the transfer of data more secure by being able to positively identify the second device.

In one embodiment, a portable computing device includes a wireless transceiver 110 to connect directly to a second device. The wireless connection may be for example Bluetooth, wifi or another wireless data connection. The controller 125 can compare impact sensor data from the impact sensor 120 to a threshold value. Based on the comparison the controller can establish a wireless connection to a second device from data read with the NFC reader. The wireless connection to the second device can be used to transmit the impact sensor data to the second device. The wireless connection can also receive impact data from the second device generated at by the impact of the portable communication device and the second device. The portable communication device can compare the impact sensor data to the impact data do determine that the two devices were impacted together rather than each being impacted against another object. If the portable communication device and the second device are impacted together their impact forces should be relative to each other and if they are not impacted together their impact forces may not be relative to each other. For example if a portable communication device is in the pocket of a first user and the second device is in the pocket of a second user and they both sit on a bench, the impact sensor may detect the impact with the bench and read the NFC tag of the second device and create a connection to the second device but comparing impact sensor data it will prevent further transfer of critical data, such as contacts, pictures, video, audio, if it can be determined that the portable communication device and the second device were not impacted together.

Figure 2A:
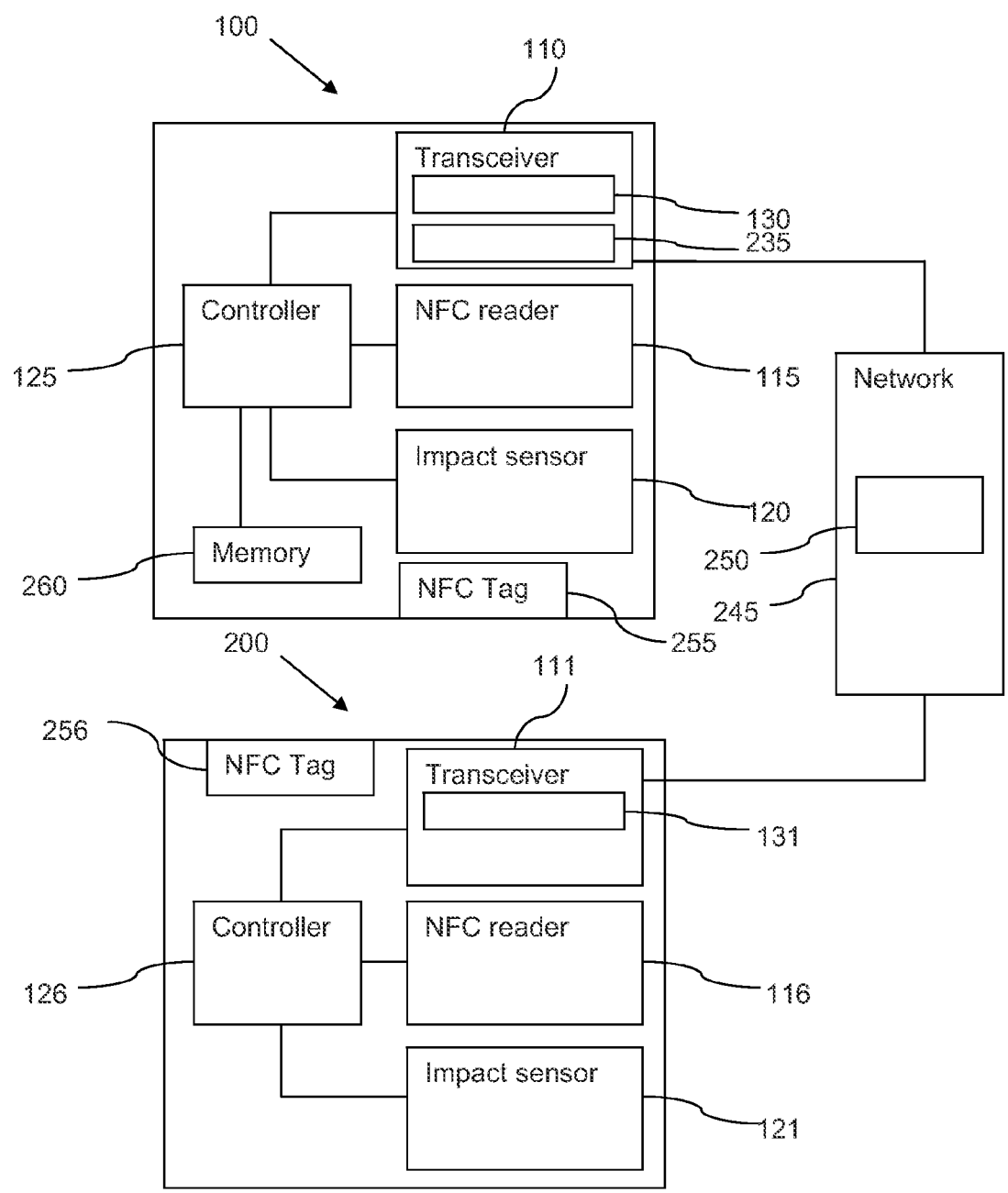
FIGS. 2a and 2b are block diagrams of a system to transfer data according to an example implementation.

FIG. 2a is a block diagram of a system to transfer data according to an example implementation. The system can include a portable communication device 100 and a second device 200. The portable communication device 100 and the second device 200 can be connected to a network 245. The NFC tag 255 can include a second NFC code that may be unique to the first device 100. The portable computing device can include a memory 260 to store the second NFC code. The second NFC code can be transmitted to the network 245 though the transceiver 110.

The wireless transceiver 110 can also transmit data 235 to a second device 200 through the network 245, wherein the data may include at least one of the first NFC code read from the NFC tag 256 of the second device 200, force data from the impact sensor 120, time data of the impact, location data or any other data that can be used to determine which device on the network is the second device 200. The data 235 sent to the second device through the network can also be contacts, picture, video, audio or another type of data.

A network can include a router 250 to receive the NFC code and/or the data 235. The router 250 can include logic to identify a second device 200 from the NFC code 256 read by the NFC reader 115 of the portable computing device 100 and additionally the data 235. The router 250 may also receive NFC code 255 read by the NFC reader 116 of the second device 200 and use it to identify the computing device. After the router determines which device is the second device the router 250 can route the data 235 to the second device 200 to be received by the transceiver 111 or data 131 from the transceiver 111 of second device 200 to the portable computing device 100. The data 235 may be for example media including pictures, video, audio; contact data; setting data. The controller 126 of the second device can also cause the transceiver 111 to send data from the NFC reader 116 or impact sensor 121 to the portable computing device 100.

Figure 2B:
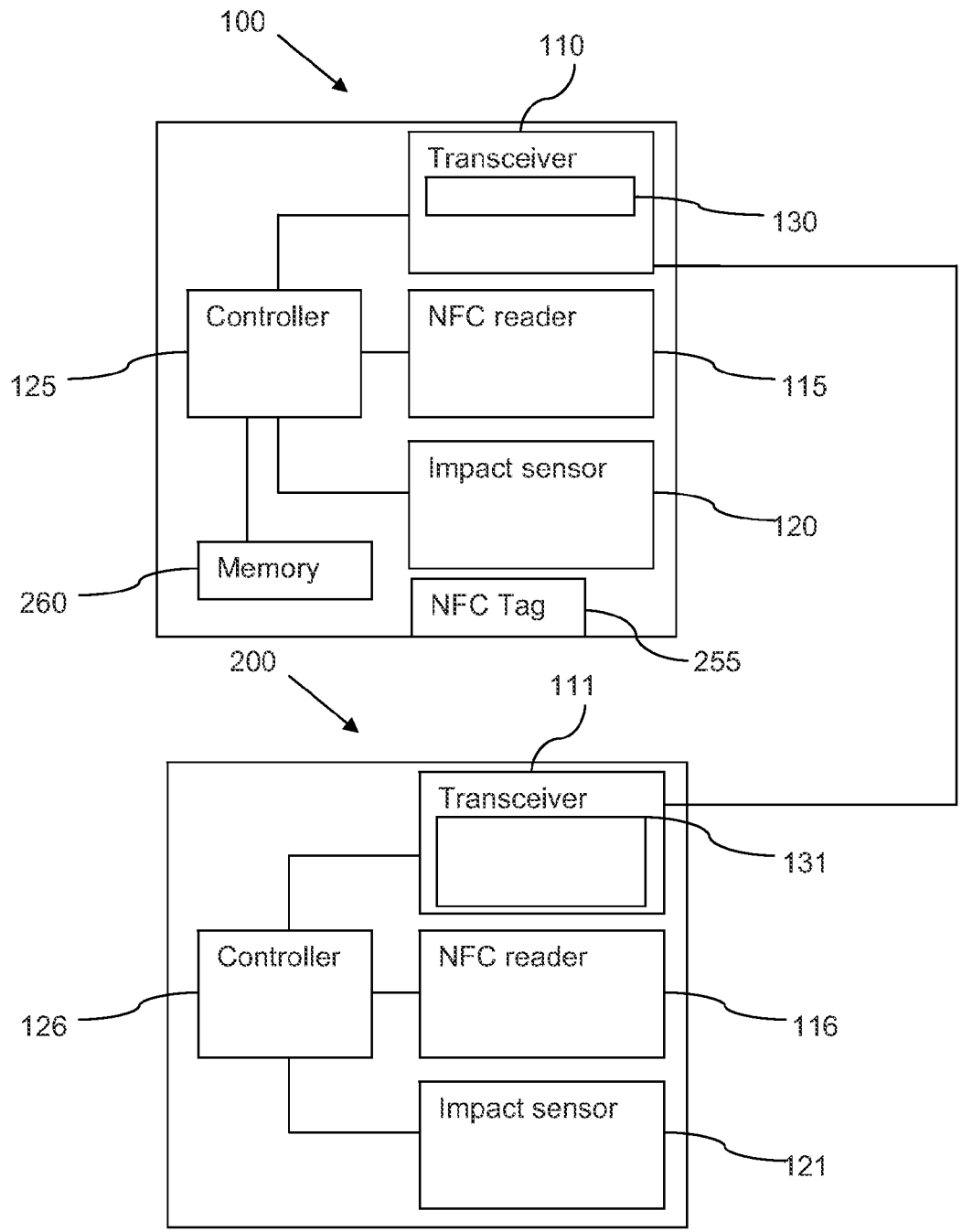

FIG. 2b is a block diagram of a system to transfer data according to an example implementation. The wireless transceiver can be connected to a second portable computing device. The data 130 can be transmitted through the wireless transceiver to the second portable computing device. The data can include impact sensor data about the impact. The portable computing device 100 can receive from the second device 200 second impact sensor data 131 generated from the impact sensor 121 in the second device 200. The portable computer 100 can compare the second impact sensor data 131 received from the second device 200 to the impact sensor data 130 generated by the impact sensor 120 in the portable computing device 100. If the impact sensor data 130 and the second impact sensor data 131 are within a threshold difference, data can be allowed data to be transmitted to the second device 200. For example if the impact sensor data 130 and this second impact sensor data 131 are within 5% difference then additional data can be transmitted to the second device 200.

In one embodiment, a timer can deactivate the NFC reader if the NFC reader is activated by the impact sensor. This can reduce the amount of battery power used by the portable computing device by reducing the amount of time that the NFC reader is polling to read NFC tags that are in range. Once a tag is read the NFC reader can deactivate or the NFC reader can be activated by the impact sensor to poll for NFC tags for a set period of time before being deactivated if the NFC reader does not read an NFC tag.

The portable computing device 100 can include a memory 260 to store a unique code, wherein the unique code is stored in the NFC tag 255 and the unique code can be sent to a second device 200 through the wireless transceiver 110 allowing the second device to compare the unique code received from the first device 100 through the wireless transmitter 110 to the unique code that the second device 200 read from the NFC tag 255 with the NFC reader 116. The portable computing device 100 can also receive a unique code from the transceiver 111 of the second device 200 and compare that code to the unique code read from the NFC tag 256 with the NFC reader 115. The controller 126 of the second device can also cause the transceiver 111 to send data from the NFC reader 116 or impact sensor 121 to the computing device 100.

Figure 3A:
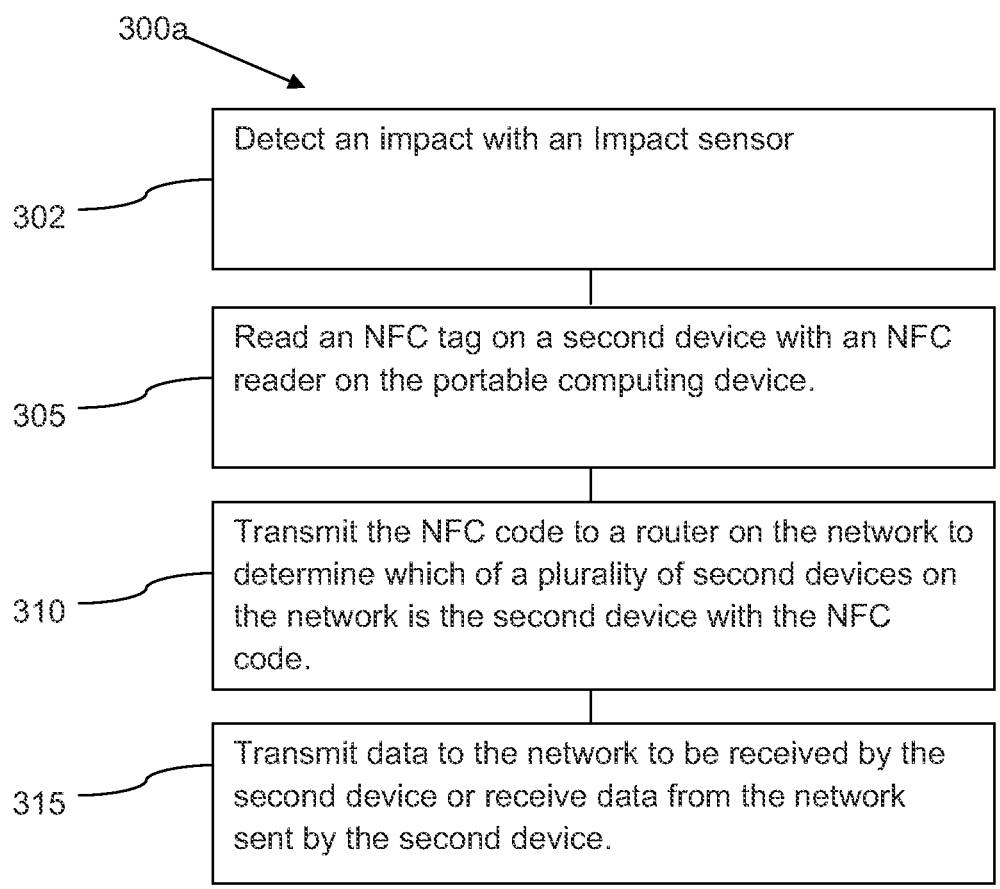
FIG. 3a is a flow diagram of a method of transferring data according to an example implementation.

FIG. 3a is a flow diagram of a method 300a of transferring data according to an example implementation. The method of transferring data can include detecting an impact with an impact sensor at 302. An NFC reader on the portable computing device can read an NFC tag on a second device at 305. The NFC code can be transmitted to a router on the network to determine which of the plurality of second devices on the network is the second device with the NFC code at 310. The portable computing device can transmit data to the network to be received by the second device or can receive data from the network that was sent to the portable computing device from the second device at 315.

Figure 3B:
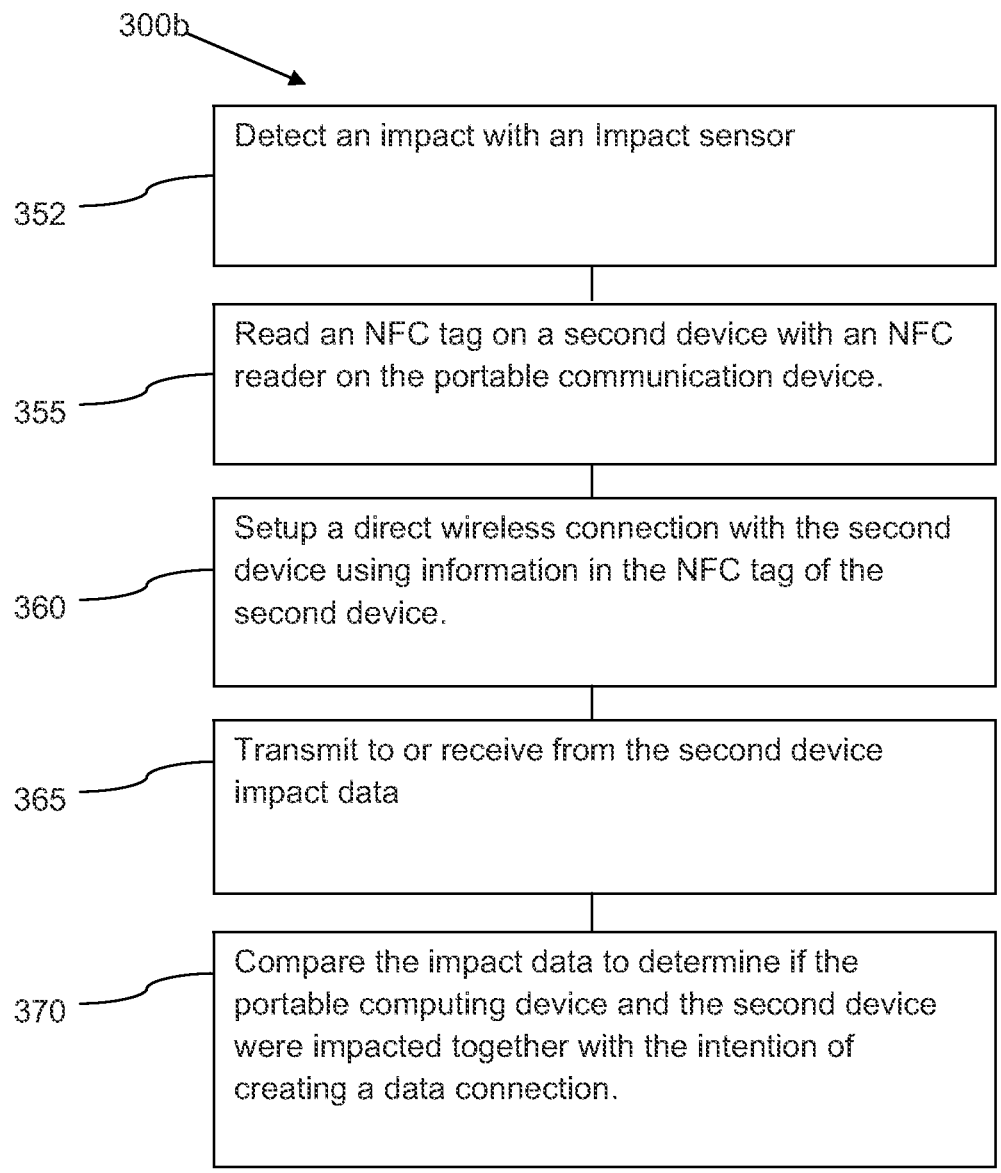
FIG. 3b is a flow diagram of a method of transferring data according to an example implementation.

FIG. 3b is a flow diagram of a method 300b of transferring data according to an example implementation. The method of transferring data can include detecting an impact with an impact sensor at 352. An NFC reader on the portable computing device can read an NFC tag on a second device at 355. A direct wireless connection with the second device can be setup using information in the NFC tag of the second device at 360. The portable computing device can transmit to or receive from the second device impact data at 365. The portable computing device and/or the second device can compare the impact data to determine if the portable computing device and the second device were impacted together to initiate a data connection at 370

Figure 4:
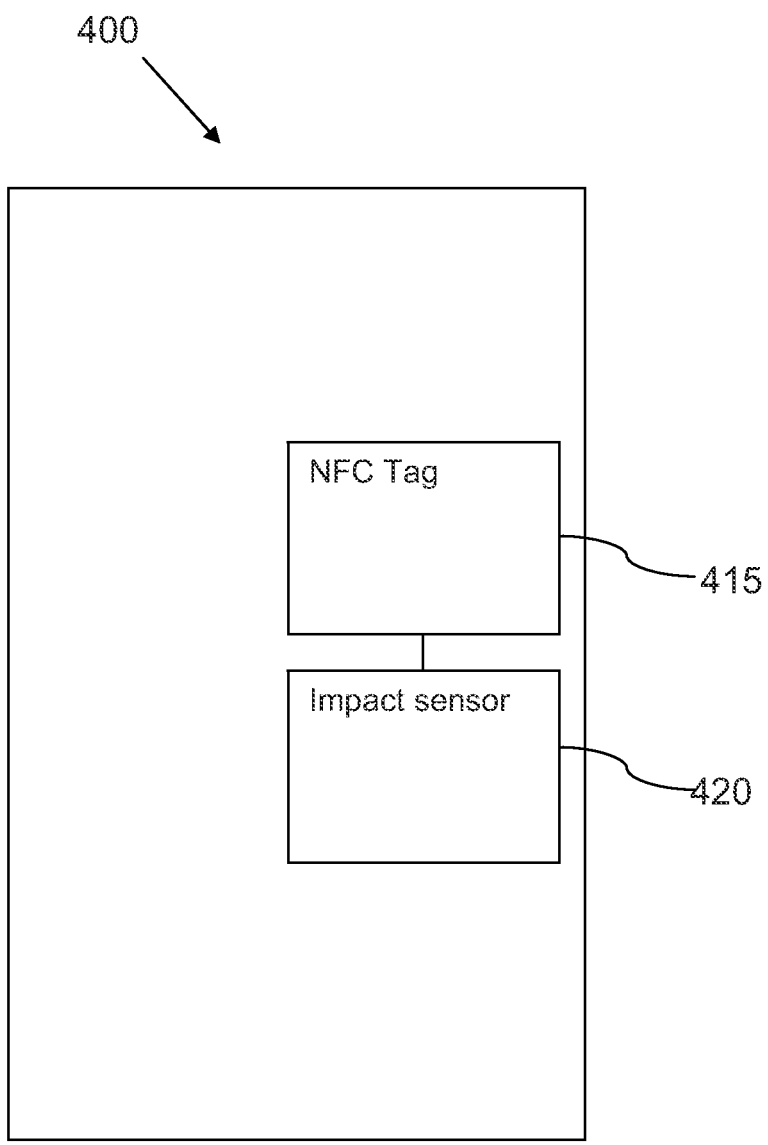
FIG. 4 is a block diagram of a device including an NFC tag according to an example implementation.

FIG. 4 is a block diagram of a device including an NFC tag according to an example implementation. The device 400 includes an NFC tag 415 and an impact sensor 420. The impact sensor 420 is connected to an NFC tag to prevent the NFC tag from transmitting data stored by the NFC tag unless the impact sensor 420 detects an impact of more than a threshold amount. This could be used to prevent theft of the information on the NFC tag by scanning the NFC tag without it intending to be scanned. For example if the information on the NFC tag was financial information such as a credit card information and a user with the device in their pocket sat on a seat in a cab that had a hidden reader or was in range of a wall with a hidden reader that was to steal the data on NFC tag. For example an NFC tag may be activated by energizing the chip using wireless power such as induction and the impact sensor may prevent the inductor from energizing the NFC tag such as by a switch that connects the terminals of the inductor together so that it does not receive power to energize the NFC tag. The NFC tag and the impact sensor may be powered by induction, battery, solar, kinetic or another power source.

Figure 5:
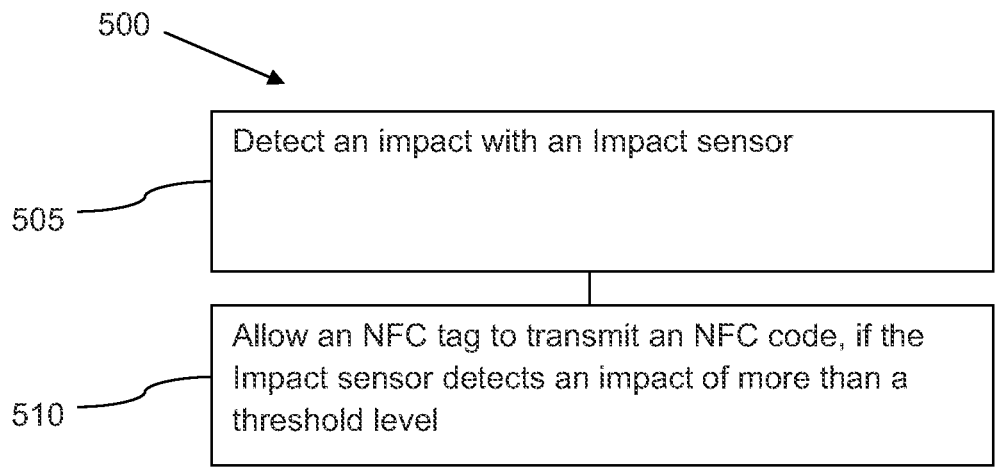
FIG. 5 is a flow diagram of a method of transferring data according to an example implementation.

FIG. 5 is a flow diagram of a method of transferring data according to an example implementation. The method 500 of communicating NFC code from a device can include detecting an impact with an impact sensor at 505. Allowing the NFC tag to transmit an NFC code if the impact sensor detects an impact of more than a threshold level at 510. For example if the transfer of data is from a device including the NFC tag to a NFC reader the device would have to be impacted against the reader with a force over a threshold level such as 1 newton. This could be used to prevent theft of the information on the NFC tag by scanning the NFC tag without it intending to be scanned.

Figure 6:
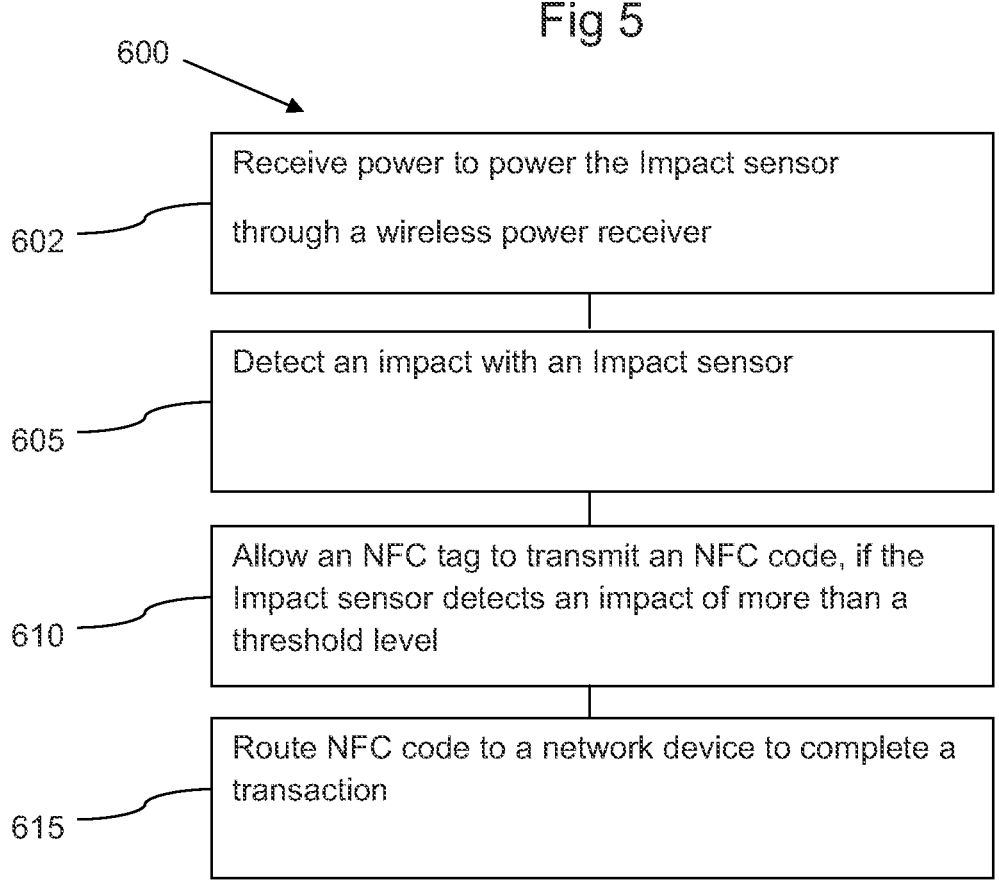
FIG. 6 is a flow diagram of a method of transferring data according to an example implementation.

FIG. 6 is a flow diagram of a method of transferring data according to an example implementation. The method 600 of communicating NFC code from a device can include receiving power to power an impact sensor through a wireless power receiver at 602. The wireless power receiver may include induction, Solar power, kinetic power or another form of powering a device without wires.

An impact can be detected with an impact sensor at 605. Allowing the NFC tag to transmit an NFC code if the impact sensor detects an impact of more than a threshold level at 610. For example if the transfer of data is from a device including the NFC tag to a NFC reader the device would have to be impacted against the reader with a force over a threshold level such as 1 newton. This could be used to prevent theft of the information on the NFC tag by scanning the NFC tag without it intending to be scanned. The NFC code can be routed to a network device to complete a transaction at 615. In one embodiment the transaction can be a financial transaction.

Figure 7:
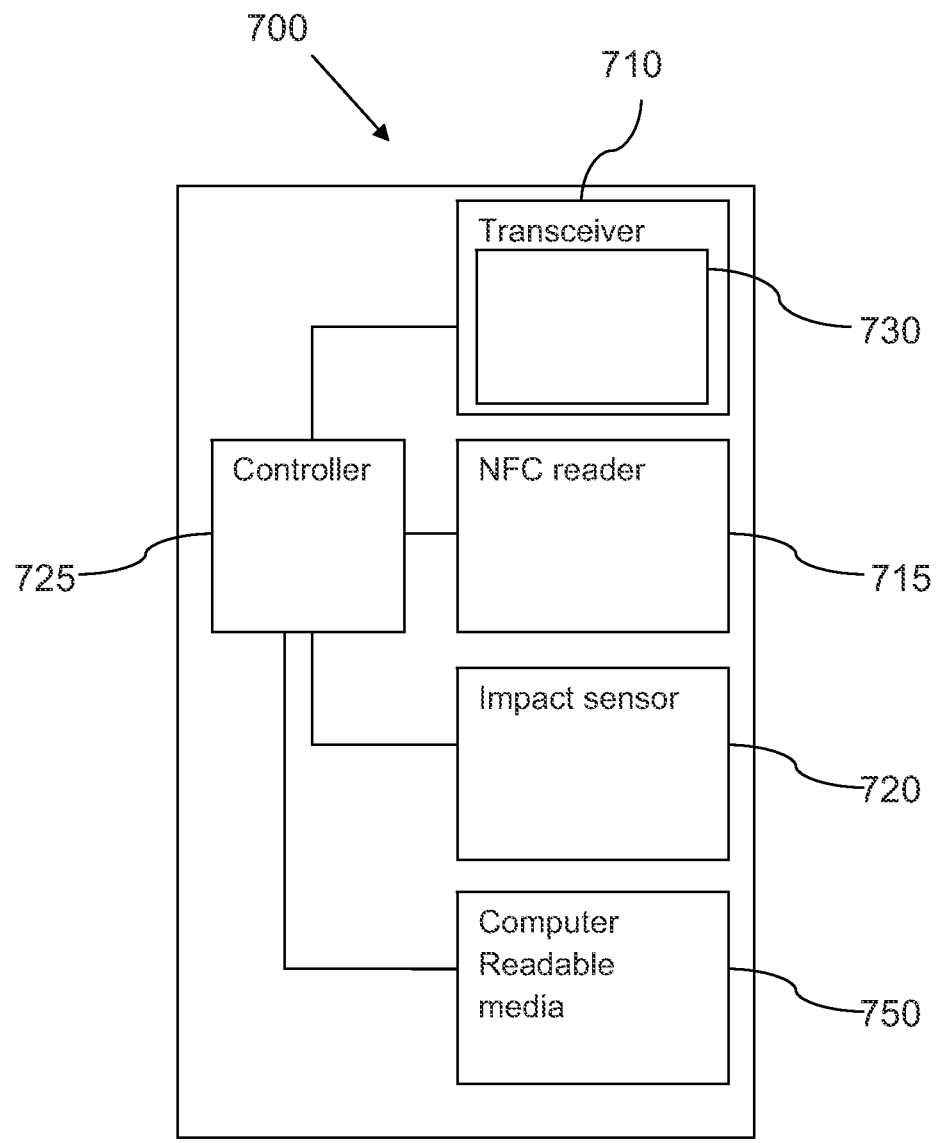
FIG. 7 is a computing system including a computer readable medium according to an example implementation.

FIG. 7 is a computing system 700 including a computer readable medium 750 according to an example implementation. The computer readable medium may include instructions that if executed by a controller 725 cause the computing system 700 to perform a method as described above using the impact sensor 720, the NFC reader 715, the transceiver 710, to send data 730.

The techniques described above may be embodied in a computer-readable medium for configuring a computing system to execute the method. The computer readable media may include, for example and without limitation, any number of the following: magnetic storage media including disk and tape storage media; optical storage media such as compact disk media (e.g., CD-ROM, CD-R, etc.) and digital video disk storage media; holographic memory; nonvolatile memory storage media including semiconductor-based memory units such as FLASH memory, EEPROM, EPROM, ROM; ferromagnetic digital memories; volatile storage media including registers, buffers or caches, main memory, RAM, etc.; and the Internet, just to name a few. Other new and various types of computer-readable media may be used to store the software modules discussed herein. Computing systems may be found in many forms including but not limited to mainframes, minicomputers, servers, workstations, personal computers, notepads, personal digital assistants, various wireless devices and embedded systems, just to name a few.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A portable computing device comprising:
   a wireless transceiver connected to a network;
   a near field communication reader;
   an impact sensor to collect impact sensor data from an impact of the portable computing device and a second portable computing device; and
   a controller connected to the impact sensor, wherein the controller is to transmit a near field communication code and the impact sensor data from the impact sensor through the wireless transceiver to a router of the network when the impact is detected by the impact sensor and when the near field communication reader reads the near field communication code from the second portable computing device when the second portable computing device is in range of the near field communication reader when the impact is detected by the impact sensor, wherein the impact sensor data and the near field communication code are to be used by the router to identify the second portable computing device.

2. The portable computing device of claim 1, further comprising a near field communication tag including a second near field communication code and a memory for storing the second near field communication code, wherein the second near field communication code is transmitted to the router when the impact is detected by the impact sensor.

3. The portable computing device of claim 1, wherein the wireless transceiver is connected to the second portable computing device and wherein the controller is further to transmit the near field communication code and the impact sensor data from the impact sensor through the wireless transceiver to the second portable computing device.

4. The portable computing device of claim 1, wherein the wireless transceiver is further to transmit time data of the impact and location data of the impact to the second portable computing device through the network.

5. The portable computing device of claim 1, wherein the router sends is to send one of media, contact data, or setting data to the second portable computing device that was received from the portable computing device.

6. A portable computing device comprising:
a wireless transceiver to connect to a second device;
a near field communication reader;
an impact sensor to:
collect impact sensor data from an impact of the portable computing device and the second device; and
enable a passive near field communication tag of the portable computing device to transmit a unique code in response to an interrogation when the impact exceeds a threshold value; and
a controller connected to the impact sensor to:
establish a wireless connection to the second device via the wireless transceiver based upon a media access control address of the second device read with the near field communication reader, wherein the wireless connection is to transmit the impact sensor data to the second device;
receive second impact sensor data from the second device, to device;
compare the second impact sensor data to the impact sensor data, data; and
transmit additional data to the second device via the wireless transceiver when the impact sensor data and the second impact sensor data are within a threshold difference.

7. The portable computing device of claim 6, further comprising a timer to deactivate the near field communication reader after the near field communication reader is activated by the impact sensor.

8. The portable computing device of claim 6, wherein the impact sensor is further to activate the near field communication reader to poll for near field communication tags for a set period of time before being deactivated.

9. The portable computing device of claim 6, further comprising a memory of the passive near field communication tag to store the unique code, wherein the wireless transceiver is further to send the unique code to the second device.

10. A method of communicating a near field communication code from a device comprising:
detecting an impact of the device and a second device with an impact sensor of the device;
transmitting the near field communication code via a passive near field communication tag of the device in response to an interrogation from the second device, when the impact sensor detects that the impact is more than a threshold level, wherein the impact sensor activates the passive near field communication tag when the impact is greater than the threshold level; and
transmitting impact data of the impact from the impact sensor through a wireless transceiver of the device to the second device when the second device is detected within a threshold period of time after the impact is detected by the impact sensor, wherein the second device is detected by a near field communication reader of the device detecting a near field communication tag of the second device.

11. The method of claim 10, further comprising:
receiving power to power the impact sensor through a wireless power receiver.

12. The method of claim 10, further comprising:
routing the near field communication code to a network device to complete a transaction.

13. The method of claim 12, wherein the transaction is a financial transaction.

* * * * *